United States Patent
Connelly

(10) Patent No.: US 10,621,294 B2
(45) Date of Patent: *Apr. 14, 2020

(54) SEMI-LOCAL BALLISTIC MOBILITY MODEL

(71) Applicant: Synopsys, Inc., Mountain View, CA (US)

(72) Inventor: Daniel Connelly, San Francisco, CA (US)

(73) Assignee: SYNOPSYS, INC., Mountain View, CA (US)

(*) Notice: Subject to any disclaimer, the term of this patent is extended or adjusted under 35 U.S.C. 154(b) by 780 days.

This patent is subject to a terminal disclaimer.

(21) Appl. No.: 15/012,734

(22) Filed: Feb. 1, 2016

(65) Prior Publication Data

US 2017/0024503 A1 Jan. 26, 2017

Related U.S. Application Data

(63) Continuation of application No. 14/283,082, filed on May 20, 2014, now Pat. No. 9,275,177.

(Continued)

(51) Int. Cl.
*G06F 17/50* (2006.01)
*G06F 17/12* (2006.01)

(52) U.S. Cl.
CPC .......... *G06F 17/5036* (2013.01); *G06F 17/12* (2013.01); *G06F 17/5009* (2013.01); *G06F 2217/08* (2013.01); *G06F 2217/16* (2013.01)

(58) Field of Classification Search
None
See application file for complete search history.

(56) References Cited

U.S. PATENT DOCUMENTS

| 6,553,339 B1 | 4/2003 | Komatsubara |
| 9,275,177 B2 | 3/2016 | Connelly |

(Continued)

FOREIGN PATENT DOCUMENTS

| JP | 2005-228893 A | 8/2005 |
| JP | 2005-228894 A | 8/2005 |

(Continued)

OTHER PUBLICATIONS

D. B. M. Klaassen, "A Unified Mobility Model for Device Simulation," 1990 IEEE IEDM, pp. 357-360. (Year: 1990).*

(Continued)

*Primary Examiner* — Leigh M Garbowski
(74) *Attorney, Agent, or Firm* — Alston & Bird LLP

(57) ABSTRACT

A transistor model defines the carrier mobility as a combination of both drift-diffusion mobility and ballistic mobility. The ballistic mobility is calculated based on the assumption that the kinetic energy of carriers near an injection point is no greater than the potential energy difference of carriers near that injection point. The abruptness of the onset of velocity saturation, as well as the asymptotic velocity associated therewith is made dependent on the degree to which the velocity is ballistically limited. The model further takes into account the inertial effects on the velocity and/or charge flux associated with carriers. The model computes the mobility and hence the velocity of carriers in accordance with their positions in the channel both along the direction of the current flow as well as the direction perpendicular to the current flow.

50 Claims, 2 Drawing Sheets

Related U.S. Application Data

(60) Provisional application No. 61/825,490, filed on May 20, 2013.

(56) References Cited

U.S. PATENT DOCUMENTS

2002/0183991 A1    12/2002    Hayashi
2011/0313748 A1    12/2011    Li

FOREIGN PATENT DOCUMENTS

WO    WO 07-120728 A2    10/2007
WO    WO 14/189932 A1    11/2014

OTHER PUBLICATIONS

Anantram et al., "Modeling of Nanoscale Devices," IEEE, 96(9):1511-1550, doi: 10.1109/JPROC.2008.927355, (2008).
Barnes et al., "Finite-Element Simulation of GaAs MESFET's with Lateral Doping Profiles and Submicron Gates," IEEE Trans. on Electron Devices, ED-23(9):1042-1048, (1976).
Belde et al., "Inclusion of the Inertial Effects in the Drift-Diffusion Equation," IEEE, pp. 94-103. (1991).
Canali et al., "Electron and Hole Drift Velocity Measurements in Silicon and Their Empirical Relation to Electric Field and Temperature," IEEE Trans. on Electron Devices, pp. 1045-1047, (1975).
Caughey et al., "Carrier Mobilities in Silicon Empirically Related to Doping and Field," Proc. of the IEEE, pp. 2192-2193, (1967).
Chen et al., "Simulation of Quantum Effects Along the Channel of Ultrascaled Si-Based MOSFETs," IEEE Trans. on Electron Devices, 49(4):652-657, (2002).
Giusi et al., "A Microscopically Accurate Model of Partially Ballistic NanoMOSFETs in Saturation Based on Channel Backscattering," IEEE Transactions on Electron Devices, 58(3):691-697, doi: 10.1109/TED.2010.2101605, (2011).
Islam et al., "Monte Carlo Study of Ultimate Channel Scaling in Si and In0.3Ga0.7 as Bulk MOSFETs," IEEE Transactions on Nanotechnology, 10(6):1424-1432, doi: 10.1109/TNAN0.2011.2165555, (2011).
Rhew et al., "Drift-diffusion equation for ballistic transport in annoscale metal-oxide-semiconductor field effect transistors," Journal of Applied Physics, 92(9):5196-5202, (2002).
Shur, "Low Ballistic Mobility in Submicron HEMTs," IEEE Electron Device Letters, 23(9):511-513, (2002).
Wei et al., "Virtual-Source-Based Self-Consistent Current and Charge FET Models: From Ballistic to Drift-Diffusion Velocity-Saturation Operation," IEEE Trans. on Electron Devices, 59(5):1263-1271, (2012).
EPO Application No. 14800247.0 (published as EP3000062), EPO Supplementary European Search Report and European Search Opinion dated Dec. 9, 2016.
U.S. Appl. No. 14/283,082, Non-Final Office Action dated Apr. 28, 2015.
U.S. Appl. No. 14/283,082, Notice of Allowance dated Oct. 28, 2015.
WIPO Application No. PCT/US2014/038791, PCT International Preliminary Report on Patentability dated Nov. 24, 2015.
WIPO Application No. PCT/US2014/038791, PCT International Search Report and Written Opinion of the International Searching Authority dated Oct. 13, 2014.

* cited by examiner

SEMI-LOCAL BALLISTIC MOBILITY MODEL

CROSS-REFERENCES TO RELATED APPLICATIONS

This application is a Continuation of U.S. application Ser. No. 14/283,082, filed May 20, 2014 and entitled "SEMI-LOCAL BALLISTIC MOBILITY MODEL", which application claims benefit under 35 U.S.C. § 119(e) of U.S. Provisional Application No. 61/825,490, filed May 20, 2013 and entitled "SEMI-LOCAL BALLISTIC MOBILITY MODEL", the contents of which are incorporated herein by reference in their entirety.

BACKGROUND

The present application relates to electronic-design-automation (EDA) tools, and more particularly to modeling of the physical properties of devices disposed in integrated circuits designed using such tools.

As transistors, such as field-effect or bipolar transistors, used to form an integrated circuit (IC) are scaled to ever smaller dimensions, the mathematical models used to describe the physical behavior of such transistors/devices need to be reconsidered. Field-effect transistors are widely used as switching elements in logic circuits. In a field-effect transistor in the on-state, charges flow from the source region to the drain region via a channel. In the off-state, charges are blocked from flowing between the source and drain regions. A gate electrode is used to turn on/off a conduction path (channel), thereby to control the flow of current between the source and drain regions.

Transistors are typically modeled either macroscopically using equations to model relationships between charge, potential, and current flux at contacts, or microscopically using a detailed representation of the device in one, two, or three spatial dimensions. The macroscopic approach, or "compact model" approach, has the advantage of computational efficiency but is relatively inefficient at predicting the effect of design changes on the device behavior. Microscopic models may be used to predict the impact of relatively minor differences on a device physical behavior as well as predicting the behaviors of substantially different devices formed in the same or similar materials.

In a typical microscopic model, a physical representation of the device is created by partitioning the device into regions, and partitioning the regions into elements bounded by vertices. Physics-based equations govern how fields vary between elements or vertices, and charge fluxes are modeled in terms of these fields. Charges are characterized using a "carrier" model, where quanta of charge is considered to be transported by individual quasi-particles called "electrons" (negatively charged) or "holes" (positively charged). The term quasi-particle describes a quantum of charge which exhibits particle-like behavior in a semiconducting crystal. This behavior includes characteristics such as velocity, momentum, energy, and mass. These quasi-particles or carriers travel between various regions of the device at speeds that depend on a number of factors, such as the electrostatic potential, the density of carriers, the lattice temperature, and the like.

A well-known model for characterizing the physics of solid state devices is the drift-diffusion model in accordance with which carrier velocity is considered dependent on local fields and their gradients. Drift-diffusion model, which is a local model, determines a series of fields and/or their gradients at any given point to predict the carrier velocity and/or flux at that point. A non-local model may additionally consider the value of fields at other points in the device.

SUMMARY

A computer-implemented method for simulating a semiconductor device, in accordance with one embodiment of the present invention, includes, in part, establishing a maximum energy associated with a carrier entering a region of the semiconductor device, defining a maximum kinetic energy associated with the carrier in accordance with the maximum energy and further in accordance with a position of the carrier within the region, and computing a velocity of the carrier in accordance with the maximum kinetic energy and further in accordance with one or more scatterings, said maximum kinetic energy establishing an upper bound for a velocity of the carrier.

In one embodiment, the computer-implemented method further includes, in part, partitioning the kinetic energy of the carrier into a ballistic component and a thermal component. In one embodiment, at least one of one or more of the scatterings represents intervalley scattering. In one embodiment, the maximum kinetic energy is characterized by a kinetic energy of the carrier entering the region and a potential energy associated with a position of the carrier within the region. In one embodiment, the maximum kinetic energy is further characterized by a local maximum of a conduction band energy associated with the region. In one embodiment, the maximum kinetic energy is further characterized by a local minimum of a valence band energy associated with region.

In one embodiment, the computer-implemented method further includes computing a ballistic mobility value for the carrier in accordance with the maximum kinetic energy. In one embodiment, the computer-implemented method further includes computing the ballistic mobility value for the carrier further in accordance with a quasi-Fermi level. In one embodiment, the computer-implemented method further includes computing a diffusion mobility value for the carrier. In one embodiment, the computer-implemented method further includes modifying the computed ballistic mobility to account for velocity saturation. In one embodiment, the computer-implemented method further includes modifying a velocity of the carrier to account for velocity saturation.

In one embodiment, the computer-implemented method further includes scaling the modified computed ballistic mobility to account for stress, and scaling the diffusion mobility to account for stress. In one embodiment, the computer-implemented method further includes computing a total mobility in accordance with the scaled modified ballistic mobility and the scaled diffusion mobility. In one embodiment, the inverses of the total mobility is defined by a sum of inverses of the scaled modified ballistic mobility and the scaled diffusion mobility.

In one embodiment, the computer-implemented method further includes computing a saturation velocity of the carrier in accordance with the ballistic mobility and the total mobility. In one embodiment, the computer-implemented method further includes modifying the velocity in accordance with an abruptness parameter indicative of an abruptness of an onset of scattering. In one embodiment, the abruptness parameter is defined by a threshold energy for generating optical phonons. In one embodiment, the abruptness parameter is further defined by the maximum kinetic energy and the Boltzmann constant.

In one embodiment, the computer-implemented method further includes computing a ballistic velocity for the carriers in accordance with the maximum kinetic energy, and computing a ballistic fraction for a position within the region. The ballistic fraction may be defined by a ratio of the computed velocity at the position and a ballistic velocity limit. In one embodiment, the computer-implemented method further includes partitioning the kinetic energy of the carrier into a ballistic component and a thermal component in accordance with the ballistic fraction. In one embodiment, the computer-implemented method further includes partitioning a population of carriers across a plurality of energy bands. In one embodiment, the computer-implemented method further includes partitioning a population of the carriers across a plurality energy bands in accordance with the ballistic fraction.

In one embodiment, the computer-implemented method further includes modifying a mean velocity of the carriers in accordance with the population of the carriers in the plurality of the energy bands. In one embodiment, the semiconductor device is a field-effect transistor. In one embodiment, the ballistic fraction defines a lattice temperature of the semiconductor device. In one embodiment, the ballistic fraction defines a carrier temperature.

In accordance with one embodiment of the present invention, a computer-implemented method of simulating a semiconductor device, includes, in part, using a local-field based model of carrier flux or velocity comprising an energy-based constraint over a semiconductor region where a velocity or mobility associated with the local field-based model is combined with a velocity or mobility associated with a maximum kinetic energy to provide an upper bound of the velocity of the carriers throughout a region of interest. In one embodiment, the region of interest is a channel region of a field-effect transistor.

A computer system, in accordance with one embodiment of the present invention, when invoked by a software program resident in the computer system establishes a maximum energy associated with a carrier entering a region of the semiconductor device, defines a maximum kinetic energy associated with the carrier in accordance with the maximum energy and further in accordance with a position of the carrier within the region, and computes a velocity of the carrier in accordance with the maximum kinetic energy and further in accordance with one or more scatterings, said maximum kinetic energy establishing an upper bound for a velocity of the carrier.

In one embodiment, when invoked by the software program, the computer system further partitions the kinetic energy of the carrier into a ballistic component and a thermal component. In one embodiment, at least one of the one or more scatterings represents intervalley scattering. In one embodiment, the maximum kinetic energy is characterized by a kinetic energy of the carriers entering the region and a potential energy associated with a position of the carrier within the region. In one embodiment, the maximum kinetic energy is further characterized by a local maximum of a conduction band energy associated with the region. In one embodiment, the maximum kinetic energy is further characterized by a local minimum of a valence band energy associated with the region.

In one embodiment, when invoked by the software program, the computer system further computes a ballistic mobility value for the carrier in accordance with the maximum kinetic energy. In one embodiment, when invoked by the software program, the computer system further computes the ballistic mobility value for the carrier further in accordance with quasi Fermi level. In one embodiment, when invoked by the software program, the computer system further computes a diffusion mobility value for the carrier.

In one embodiment, when invoked by the software program, the computer system further modifies the computed ballistic mobility to account for velocity saturation. In one embodiment, when invoked by the software program, the computer system further modifies a velocity of the carrier to account for velocity saturation. In one embodiment, when invoked by the software program, the computer system further scales the modified computed ballistic mobility to account for stress, and scales the diffusion mobility to account for stress.

In one embodiment, when invoked by the software program, the computer system further computes a total mobility in accordance with the scaled modified ballistic mobility and the scaled diffusion mobility. In one embodiment, an inverses of the total mobility is defined by a sum of inverses of the scaled modified ballistic mobility and the scaled diffusion mobility. In one embodiment, when invoked by the software program, the computer system further computes a saturation velocity of the carrier in accordance with the ballistic mobility and the total mobility. In one embodiment, when invoked by the software program, the computer system further modifies the velocity in accordance with an abruptness parameter indicative of an abruptness of an onset of scattering.

In one embodiment, the abruptness parameter is defined by a threshold energy for generating optical phonons. In one embodiment, the abruptness parameter is further defined by the maximum kinetic energy and the Boltzmann constant. In one embodiment, when invoked by the software program, the computer system further computes a ballistic velocity for the carriers in accordance with the maximum kinetic energy, and computes a ballistic fraction for a position within the region. The ballistic fraction is defined by a ratio of the computed velocity at the position and a ballistic velocity limit.

In one embodiment, when invoked by the software program, the computer system further partitions the kinetic energy of the carrier into a ballistic component and a thermal component in accordance with the ballistic fraction. In one embodiment, when invoked by the software program, the computer system further partitions a population of carriers across a plurality of energy bands. In one embodiment, when invoked by the software program, the computer system further partitions a population of the carriers across a plurality energy bands in accordance with the ballistic fraction. In one embodiment, when invoked by the software program, the computer system further modifies a mean velocity of the carriers in accordance with the population of the carriers in the plurality of the energy bands.

In one embodiment, the semiconductor device is a field-effect transistor. In one embodiment, the ballistic fraction defines a lattice temperature of the semiconductor device. In one embodiment, the ballistic fraction defines the carrier temperature.

A non-transitory computer-readable storage medium, in accordance with one embodiment of the present invention, includes, in part, instructions for designing/simulating a circuit using a device mode. The instructions when executed by a computer cause the computer to establish a maximum energy associated with a carrier entering a region of the semiconductor device, define a maximum kinetic energy associated with the carrier in accordance with the maximum energy and further in accordance with a position of the carrier within the region, and compute a velocity of the carrier in accordance with the maximum kinetic energy and further in accordance with one or more scatterings, said maximum kinetic energy establishing an upper bound for a velocity of the carrier. In one embodiment, the instructions further cause the computer to partition the kinetic energy of the carrier into a ballistic component and a thermal component.

In one embodiment, at least one of the one or more scatterings represents intervalley scattering. In one embodiment, the maximum kinetic energy is characterized by a kinetic energy of the carriers entering the region and a potential energy associated with a position of the carrier within the region. In one embodiment, the maximum kinetic energy is further characterized by a local maximum of a conduction band energy associated with the region. In one embodiment, the maximum kinetic energy is further characterized by a local minimum of a valence band energy associated with region.

In one embodiment, the instructions further cause the computer to compute a ballistic mobility value for the carrier in accordance with the maximum kinetic energy. In one embodiment, the instructions further cause the computer to compute the ballistic mobility value for the carrier further in accordance with quasi Fermi level. In one embodiment, the instructions further cause the computer to compute a diffusion mobility value for the carrier. In one embodiment, the instructions further cause the computer to modify the computed ballistic mobility to account for velocity saturation. In one embodiment, the instructions further cause the computer to modify a velocity of the carrier to account for velocity saturation.

In one embodiment, the instructions further cause the computer to scale the modified computed ballistic mobility to account for stress, and scale the diffusion mobility to account for stress. In one embodiment, the instructions further cause the computer to compute a total mobility in accordance with the scaled modified ballistic mobility and the scaled diffusion mobility. In one embodiment, an inverses of the total mobility is defined by a sum of inverses of the scaled modified ballistic mobility and the scaled diffusion mobility.

In one embodiment, the instructions further cause the computer to compute a saturation velocity of the carrier in accordance with the ballistic mobility and the total mobility. In one embodiment, the instructions further cause the computer to modify the velocity in accordance with an abruptness parameter indicative of an abruptness of an onset of scattering. In one embodiment, the abruptness parameter is defined by a threshold energy for generating optical phonons. In one embodiment, the abruptness parameter is further defined by the maximum kinetic energy and the Boltzmann constant.

In one embodiment, the instructions further cause the computer to compute a ballistic velocity for the carriers in accordance with the maximum kinetic energy, and compute a ballistic fraction for a position within the region. The ballistic fraction defined by a ratio of the computed velocity at the position and a ballistic velocity limit. In one embodiment, the instructions further cause the computer to partition the kinetic energy of the carrier into a ballistic component and a thermal component in accordance with the ballistic fraction. In one embodiment, the instructions further cause the computer to partition a population of carriers across a plurality of energy bands.

In one embodiment, the instructions further cause the computer to partition a population of the carriers across a plurality energy bands in accordance with the ballistic fraction. In one embodiment, the instructions further cause the computer to modify a mean velocity of the carriers in accordance with the population of the carriers in the plurality of the energy bands. In one embodiment, the semiconductor device is a field-effect transistor. In one embodiment, the ballistic fraction defines the lattice temperature of the semiconductor device. In one embodiment, the ballistic fraction defines the carrier temperature.

DETAILED DESCRIPTION OF THE INVENTION

Figure 1:
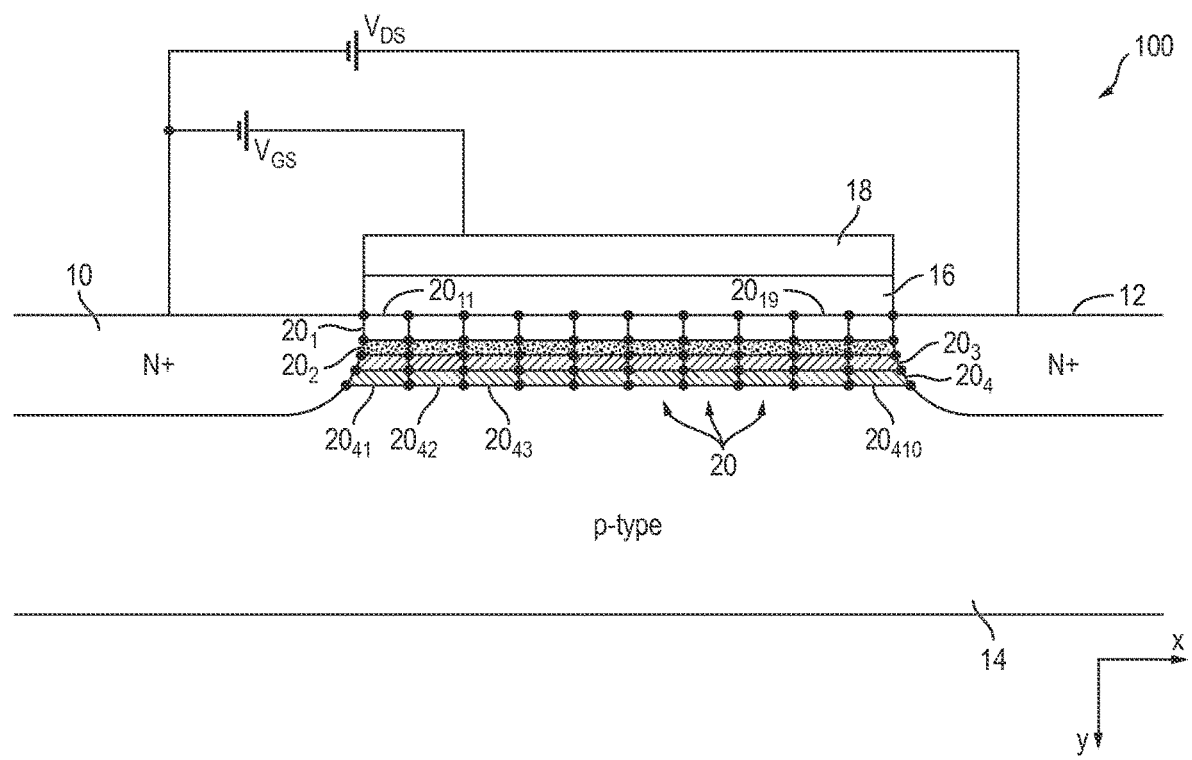
FIG. 1 is a cross-sectional view of a field-effect transistor having a physical model characterized by carriers whose velocity along the channel depends on their position along the channel, in accordance with one embodiment of the present invention.

In accordance with embodiments of the present invention, physical models and simulations of semiconductor devices are enhanced by taking into account, among other factors, inertial effects on the velocity and/or charge flux associated with carriers. The inertial effects may require an adjustment to, for example, three components of the carrier transport, namely velocity in the absence of high-energy scattering mechanisms, the abruptness of the onset of high-energy scattering mechanisms, and the high-energy limit imposed by high-energy scattering mechanisms. Additionally, other high-energy effects like the transferred carrier effect are also considered. Moreover, the degree to which carrier transport is ballistic may be used to reduce the degree of carrier heating.

In accordance with one embodiment of the present invention, a local-field based model of carrier flux or velocity is modified by applying an energy-based constraint over a semiconductor region where the velocity or mobility associated with a local field-based model is combined with the velocity or mobility associated with a local kinetic energy constraint. Such a kinetic energy is calculated from a total energy that is either explicitly provided or derived from a simulation domain while taking into account the conservation energy. In one embodiment, this total energy derivation is assumed at an injection point or manifold at which the local field is used to derive the carrier velocity. Such velocity is subsequently used to derive a kinetic energy which when combined with the carrier potential energy at that region yields a total energy applied to carriers throughout the region of interest such as, for example, a channel region of a field-effect transistor. The kinetic energy is used to calculate a ballistically adjusted velocity or mobility. The combination of the velocity (or mobility) derived for the ballistic limit and the velocity derived from the local field provides a velocity or mobility which is not greater than the velocity or mobility derived for the ballistic limit.

According to the well-known Matthiessen's rule, models for velocity saturation or other energy-dependent scattering effects are optionally modified to provide a more accurate value for the ballistic limit when carrier velocity is constrained by inertia, or equivalently when it is limited by the kinetic energy constraint. An example of a model for velocity saturation is one which uses optical phonon scattering. In the well-known Canali model, a number of parameters describe the asymptotic limit to carrier velocity and the abruptness with which velocity approaches this limit. With the Canali model, the saturation velocity may be increased by a factor of up to the square root of, for example, 3, if the velocity is at the ballistic limit. The abruptness term may be increased based on the ratio of the optical phonon scattering threshold to the sum of the injection point lattice temperature and the ballistic limit to kinetic energy at any given point. For models where carrier temperature is calculated, a ballistic fraction can be used to partition energy into ballistic and thermal components.

Local models are numerically easier to solve than non-local models. However, it is often beneficial to add non-localities to a model set. For example, a gate terminal of a field-effect transistor is typically separated from the channel region by an insulator (gate oxide) which blocks the flow of charge between the gate and the channel. But as devices are made smaller and the insulator between the gate and the channel becomes thinner, charge is more readily able to leak between the gate and the channel due to the quantum tunneling effect. Quantum tunneling models are typically incorporated into the drift-diffusion models using non-local relationships. For example, the charge flux through an insulator depends on an integral performed through the full thickness of the insulator. Therefore the charge flux at various points in the channel may depend on the electric field values taken throughout the thickness of the gate insulator. Consequently, as devices shrink, non-local adjustments to the local models become increasingly important.

The carrier velocity in the drift-diffusion model is defined by the local field values. As such, the component of the charge carrier velocity is assumed to be proportional to the gradient of the electrostatic potential. For example, assume that a positively charged carrier is at a point with a given electrical potential that is higher than the potential of an adjacent point. The carrier is thus moved to the position of a lower potential. The steeper the gradient of the electrostatic potential between the two points, the higher is the velocity with which the carrier typically flows between the points. In other words, the drift-diffusion model generally predicts that a steeper gradient in electrostatic potential yields for a given carrier type in a given material with the same physical characteristics at the same lattice temperature a higher carrier velocity.

In the present application, it is understood that a local field-based model may be enhanced by non-local effects. For example, the drift-diffusion model, which is a local field-based model, is enhanced by a non-local tunneling model which allows for the generation or recombination of carriers due to tunneling of carriers from other non-adjacent positions. There may be other non-local adjustments to the velocity. Accordingly, a model, in accordance with embodiments of the present invention, is assumed to be defined, in part, by a local model for carrier velocity of at least one carrier type where the velocity is defined, in part, in terms of local field values.

A mechanical analogy of this relationship is coasting on a bicycle on a road down a hillside. If the road descends gradually the bike will go slower, while if the road descends steeply the bike will go faster. The relationship between the slope of the road and the bike speed may not be strictly linear, and it may depend on other factors such as the resistance generated by the tires or how aerodynamically efficient the rider and bike move through the air. But the relationship between the road gradient and the bike speed typically holds.

Further to this bike analogy, if the hill is long the bike may quickly reach a terminal velocity—determined by a dynamic balance between the force of gravity and the retarding forces of the air, tires, and other sources of friction—relative to the length of the descent. In reality, due to inertia, the bike requires a non-zero distance to approach a terminal velocity. Assume that the road is descending relatively slowly and the bike is rolling at a relatively constant speed. Assume further that suddenly the bike passes onto a section of roadway where it becomes instantly steeper. Accordingly, there will be a time interval when the bike's speed steadily increases until it approaches a new terminal velocity associated with the steeper gradient. Similarly, if the hill then flattens, it will take a non-zero distance before the imbalance between propulsive gravitational force and the retarding frictional forces again achieve a new balance. The bike will then have a higher than normal speed for the shallower gradient following the steep descent until it again approaches static balance and reaches the speed associated with the lesser gradient.

If the gradient of the road changes very rapidly, for example steeper and more gradual over only a few meters, then the steady-state speed is never reached. The bike is continuously either speeding up or slowing down. In such a situation the speed is no longer dependent only on local parameters. It is instead additionally dependent on parameters associated with the bike's positions at previous times. A local model which treats the speed of the bike as a function of the characteristics of only its present position will not adequately describe its speed at every position.

With the bike descending a hill with rapidly changing grade, modeling the speed as a function of position typically requires modeling the acceleration as a function of the forces due to speed and the road's slope at each position, and integrating the acceleration with respect to time to derive speed. An analogy to this approach in device simulation is the so-called Monte Carlo simulation which simulates the time history of particles as they travel through a device. This is a time-consuming calculation as it must be done self-consistently while taking into account carrier interactions. Therefore the different time histories of different carriers that are subject to different random events must be calculated. Monte Carlo simulation is a valuable technique for estimating device behavior but because it integrates the history of carriers or their ensembles over time, it is computationally slower than the local models. For many applications, particularly those involving complex devices, local modeling is preferred.

The descending bike problem can be simplified if, for example, the atmospheric effect is insignificant and other sources of friction are insignificant. In such cases where the acceleration or deceleration due to gravity is assumed to be the only force acting on the bicycle, the principle of energy conservation may be used for arbitrary complex hill profiles. Neglecting friction and in the absence of any propulsion, the sum of potential and kinetic energies is conserved. The potential energy of the bicycle and its rider is a function of their altitude, while their kinetic energy is a function of their speed. Therefore if the potential energy at any given position and the total energy are known, the kinetic energy and hence the speed can be calculated. Thus, despite relatively complex kinetics and the strong influence of inertia, the speed can be determined as a function of position. Therefore, knowing the total energy, which in turn depends on an initial condition, is important.

Assume that as an initial condition, the rider begins from rest at the top of a hill and then moves to the beginning of a descent before accelerating down the hill. Accordingly, the initial condition is defined by the potential energy of the initial point at the hilltop. The total energy is the sum of the potential energy and the kinetic energy associated with the speed the rider achieve prior to the downhill movement.

In a more typical situation where the rider encounters wind resistance and rolling friction from the tires, the speed calculated using the conservation of energy approach will typically be an upper bound—assuming there is no strong tail wind pushing the rider along. There are two simplifying limits. In one limit, the rider is assumed to be fully ballistic, without any retarding forces, thereby causing the total energy to be conserved and the speed to be limited only by inertia. In the other limit, the inertia is assumed to be insignificant and the speed limited by the dynamic balance between the retarding forces and the acceleration caused by the gravity. In each of these cases, the speed can be calculated as a function of position for a known initial condition. Near the beginning of the hill where the potential energy is close to that of the initial potential energy and the kinetic energy is relatively close to its initial small value, the ballistic speed limit may well be less than that calculated under the assumption of the dynamic balancing of forces. Further down the hill, where in the absence of retarding forces the rider would have been accelerating through a substantial change in altitude, the ballistic speed may be much higher than the speed calculated assuming the dynamic balancing of forces.

The speeds determined using the ballistic limit and the balance-of-forces limit are approximations. The speed may further be calculated by integrating the force over time or over distance and converting the resulting momentum or energy into speed or velocity. The result of this rigorous calculation for a given position might be greater or less than the balance of forces result, but it would be no larger than the ballistic approximation which sets upper bound on speed. For example, assume that the simplicity of the balance-of-forces estimate made it a preferred approach, and that over a large fraction of a given hill, the assumptions of the balance-of-forces approach generally apply. In other words, assume that the grade of the hill changes relatively slowly, and that the hill is sufficiently long that the inertial effects fail to dominate over much of the length of the hill. The ballistic limit could then be used to refine the speed. This would apply near the beginning of the hill where the grade or slope increases rapidly, and where due to the inertia the rider has not yet had the time or travelled the distance required for the speed to approach that at which the accelerating and retarding forces come into balance. In such a case, the ballistic limit and the balance-of-forces estimate could be combined in such a way that the result could be no larger than the ballistic limit. Therefore, near the beginning of the hill the predicted speed would be less than that predicted by the balance-of-forces model, while further down the hill the speed would approach that predicted by the balance-of-forces model.

As described above, inertia or the tendency of a moving object to maintain its momentum affects local modeling. Like bicycles, quasi-particles, electrons and holes, also have masses. Due to inertia, when an electron or hole moves from a region where the electric field is smaller to another region where the electric field is larger, the momentum and velocity fail to reach their steady-state values instantaneously.

The motion of an electron or hole in the channel of a field-effect transistor is analogous to that of the bicycle. Potential energy of the electron or hole may be viewed as an electrostatic potential multiplied by a carrier charge. Retarding forces affecting electrons or holes are due to such phenomena as acoustic and optical phonon scattering, carrier-to-carrier scattering, local and remote Coulombic scattering, surface roughness scattering, and thickness variation scattering. Kinetic energy of an electron or hole may be defined by half the product of the mass and the square of its velocity. Thus with an electron, as with the bicycle, the same approximations can be applied to model the speed using a balance of forces and conservation of energy taking into account initial conditions.

The well-known drift-diffusion model is an example of the balance-of-forces model. While such a model makes assumptions about the scattering lengths and rates at which potential changes occur, it uses relationships between the local fields and carrier velocity. Conventional drift-diffusion models may be calibrated to match different device considerations but tend to over-predict the current in relatively small transistors, particularly at relatively low drain biases.

In an article entitled "Low Ballistic Mobility in Submicron HEMTs", IEEE Electron Device Letters, vol. 23, No. 9, September 2002, Michael S. Shur describes a compact (macroscopic) adjustment to the small transistor models by applying the Mathiessen's rule, described further below, to the mobility in the channel. To achieve this, Shur uses a mobility component called the ballistic mobility required to reach the ballistic limit of carrier velocity—representing an upper bound on the magnitude of the velocity attainable at any given position based on the total energy the charge particles may first experience via ballistic transport through the device. In a semiconductor device, the carriers may approach a region of high electric field (steep potential energy) at relatively slow speed, and then accelerate through the region of high electric field at a rate up to the ballistic limit. Shur models the kinetic energy as a combination of a thermal component and a translational component. In the case of degenerate semiconductors where carriers are energized by the effective pressure associated with high concentrations, an additional energy associated with that degeneracy (the "Fermi velocity") is used. The maximum speed with which carriers could traverse the channel is used to calculate the aggregate effective ballistic mobility. In Shur's model, however, the carrier velocity is assumed to remain constant throughout the channel. Such a model is a form of compact modeling.

But while the overall charge flux in a device can be adjusted with compact models, it is desirable to model the effect microscopically. A kinetic energy based approach may be used to locally model the effect of the ballistic limit on carrier velocity and therefore on carrier flux, as is described in detail below.

In an article entitled "Virtual Source-Based Self-Consistent Current and Charge FET Models: From Ballistic to Drift-Diffusion Velocity Saturation Operation", IEEE Transactions On Electron Devices, Vol. 59, No. 5, May 2012, Lan Wei, Omar Mysore, and Dimitri Antoniadis propose a compact model which defines a virtual source/drain and a channel that is partitioned into a relatively small discrete set of nodes. A potential profile is solved self-consistently with velocity and charge under the constraint that the total energy, including a sum of potential and kinetic energy, does not exceed a threshold established at the virtual source. This establishes a ballistic velocity which is associated with a ballistic component of channel charge calculated based on the ratio of ballistic kinetic energy to the drain-to-source bias. Wei et al's model is a macroscopic model, treats channel and non-channel regions similarly and is specifically applied to an insulated gate field-effect transistor. Wei et al's model is different than compact and microscopic models which are tailored to a given device type.

Another approach to modeling ballistic effects in field effect transistors is described in "Drift-Diffusion Equation For Ballistic Transport In Nanoscale Metal-Oxide-Semiconductor Field Effect Transistors," Journal Of Applied Physics, Vol. 92, No. 9, November 2002, pp. 5196-5202, Rhew, Jung-Hoon; and Lundstrom, M. S. This article describes a one-dimensional model of the transport between the source and drain regions of a field-effect transistor using a "two-stream" model in which the source-to-drain carriers are modeled separately from the drain-to-source carriers. The ballistic transport described by Rhew et al. is affected by scattering which is calculated using a low-field mobility assigned to the channel. The multi-stream ballistic model of Rhew, et al. is one-dimensional and is specific to the field-effect transistor with carriers traveling directly between the source and drain regions. Rhew et al's model is only a one dimensional model, and is therefore not a true position-dependent model. Rhew et al's model assumes a left stream and a right stream. However, in practice carriers move in all directions which Rhew et al fail to account for.

When the electric field is relatively small, carriers may experience a drift velocity proportional to the electric field. However, as the carriers accelerate, their kinetic energy may reach a threshold at which it is quantum mechanically favorable for certain processes to result in the loss of the kinetic energy, for example, the generation of optical phonons. As is known, phonons are vibrations in the crystal lattice, and optical phonons occur when adjacent atoms or groups of atoms vibrate in opposite direction. In classical physics, neglecting quantum mechanics such as vibrations could occur at any energy. However, quantum mechanics imposes the restriction that such vibrations can occur at only discrete energies, the lowest energy being equal to the product of Planck's constant and the vibrational frequency. A traveling carrier's kinetic energy is not transferred to the lattice vibration until the kinetic energy reaches a threshold. But as the kinetic energy of the carriers reaches a quantum mechanical threshold value for such processes as optical phonon generation to occur, the rate of energy loss increases. Consequently there is a tendency for the carriers ensemble average velocity to approach a value associated with kinetic energy near the threshold for optical phonon scattering.

The effects of processes, such as optical phonon generation, are typically captured by the drift-diffusion model using a "high field saturation" adjustment to the mobility, velocity, or carrier flux. One such form of adjustment is described in "Carrier Mobilities in Silicon Empirically Related to Doping and Field", IEEE Transactions on Electron Devices, Vol. 55, No. 12, 1967, pp. 2192-2193, D. M. Caughey and R. E. Thomas. The Caughey et al. model was generalized to a more universal form in "Electron and Hole Drift Velocity Measurements in Silicon and Their Empirical Relation to Electric Field and Temperature", IEEE Transactions on Electron Devices, Vol. ED-22, No. 11, 1975, pp. 1045-1047, C. Canali et al. In Canali et al's model, the reduction in mobility or velocity is a function of, and thus partly defined by, the carrier velocity. This functionality or relationship is described by two parameters, namely a saturation velocity (the maximum obtainable ensemble average velocity for carriers before optical phonon scattering becomes so dominant that the velocity can increase no further) and a unitless parameter which describes how gradually the limit is approached. This unitless parameter is referred to hereinbelow as $\beta$. As described further below, in accordance with one aspect of the present invention, parameter $\beta$ as well as the saturation velocity $V_{sat}$ may vary depending on the degree of carrier ballisticity, and therefore are affected by whether the carrier velocity is limited by kinetic energy or scattering.

In GaAs and other III-V compounds, it is important to consider the transferred carrier effect. According to this effect, carriers may acquire sufficient energy to transition (transfer momentum and energy) from a relatively high-velocity momentum state (for example, an electron $\Gamma$ valley) to a relatively lower-velocity momentum state (for example, an electron L valley), and therefore experience a reduction in their velocity. This transition may be relatively suppressed in ballistic carriers than in carriers which have been exposed to a rich scattering history and for which the maximum obtainable kinetic energy is much higher than the threshold energy required for the momentum transfer to take place. An example of a local model which takes into account the transferred carrier effect is described in "Finite-Element Simulation of GaAs MESFET's with Lateral Doping Profiles and Submicron Gates", IEEE Transactions on Electron Devices, vol. ED-23 No. 9, 1976, pp. 1042-1048, J. J. Barnes, R. J. Lomax, and G. I. Haddad. Barnes et al's model assumes a steady-state electric field and fails to consider inertial effects.

As described above, in the conventional drift-diffusion based models, carriers are assumed to be in thermal equilibrium with the semiconductor lattice. Such models are hampered by their failure to adequately treat, among other factors, the effects of inertia, especially near the point at which carriers are injected into the channel from the source. Other conventional models that assume carriers heat as they accelerate, fail to recognize that a carrier's temperature should describe the random, disordered component of its motion rather than its total kinetic energy in the inertial reference frame of the lattice.

A transistor model, in accordance with one embodiment of the present invention defines the carrier mobility as a combination of both drift-diffusion mobility and ballistic mobility. The ballistic mobility, or alternatively the ballistic velocity is calculated based on the assumption that the kinetic energy of carriers near an injection point is no greater than the potential energy difference of carriers near that injection point. In accordance with another aspect of the present invention, the abruptness of the onset of velocity saturation, as well as the asymptotic velocity associated therewith is made dependent on the degree to which the velocity is ballistically limited. A model, in accordance with one embodiment of the present invention, therefore has a significantly enhanced accuracy. The model further takes into account the inertial effects on the velocity and/or charge flux associated with carriers. The inertial effects may require an adjustment to three components of the carrier transport, namely the velocity in the absence of high-energy scattering mechanisms, the abruptness of the onset of high-energy scattering mechanisms, and the high-energy limit imposed by high-energy scattering mechanisms. Other high-energy effects such as the transferred carrier effect are included. Also for models where carrier temperature(s) are modeled, the degree to which carrier transport is ballistic can be used to reduce the degree of carrier heating. The model, therefore, accounts for variations of carrier mobilities and various energy-dependent scattering parameters so as to account for such effects as velocity saturation. The model further enables the transferred carrier effect to behave differently under conditions where carriers are primarily ballistically limited rather than drift-diffusion limited. To achieve these advantages, embodiments of the present invention provide a microscopic or compact model that partition the channel into a multitude of segments to each of which a kinetic energy constraint is applied. Since a model, in accordance with embodiments of the present invention is microscopic, it equally applies to any arbitrary device in addition to the insulated-gate field-effect transistors. The model further takes into account the degree to which the ballistic movement of the carriers may be used to adjust, and in particular reduce, the carrier temperature in a hydrodynamic model.

In accordance with one aspect of the present invention, a maximum or total energy for the carriers is determined in a ballistic region, for example, in the channel region of a field-effect transistor. The total energy may be explicitly provided or alternatively extracted based on one or more assumptions. An example of such an assumption is that under many biasing conditions, a device includes an injection point near which carriers move with a predictable scattering distribution. One such distribution is the Maxwellian velocity distribution associated with local thermal equilibrium within the semiconductor lattice. At or near the injection point, the carriers are assumed to be subject to inertial constraints defining a maximum kinetic energy for the carriers. The ballistic velocity along any point along the channel is then be defined as the sum of (i) this maximum kinetic energy and the (ii) difference between the potential energy at or near the injection point and the potential energy at that point in the channel. Therefore, assuming that the sum of the potential and kinetic energy is conserved in a ballistic transport, changes in kinetic energy equal differences in potential energy. In some embodiments, the carriers are assumed to be in local thermal equilibrium with each other.

As described above, embodiments of the present invention modify the local field-based mobility model by applying a regional energy constraint on the sum of the potential and kinetic energy, as well as other sources of energy. The kinetic energy component is used to derive a ballistic limit for the velocity which is then combined with the velocity extracted from a local field-based model to yield a ballistically-modified local velocity. In other embodiments, ballistic mobility and ballistically-modified mobility may be used to derived associated velocities when used with the local field-based model.

In accordance with one aspect of the preset invention, the carrier transport model is applied to a region (domain) where one or more carriers may be exposed to an inertially limited acceleration, thereby limiting their ballistic velocity/mobility. For example, the channel region of a field-effect transistor typically extends between a source region and a drain region and encapsulates carriers of the same type as those which dominate the source and drain. The carriers appear when a potential is applied to the gate. The source region extends to an injection point or region proximate to the channel and from where ballistic transport may occur. For example, a field-effect transistor may include a metal contact, a degenerately n-type doped source region, a lightly doped, undoped, or oppositely doped channel region, and a drain region with the same doping type as the source.

FIG. 1 is a simplified cross-sectional view of an n-type field-effect transistor 100 modeled in accordance with one embodiment of the present invention. Transistor 100 is shown as including, in part, an n-type source region 10 and an n-type drain region 12 formed in p-type substrate 14. Transistor 100 is also shown as including a gate insulator 16, and a polysilicon or metal gate 18. Channel 20 is formed between the source region 12 and drain region 14 in response to the application of voltage $V_{GS}$ between gate 18 and source region 10. A current flows between the source and drain regions when voltage $V_{DS}$ is applied therebetween. As is seen in FIG. 1, channel 20 is divided into four segments perpendicular to the source-drain direction, namely segments $20_1$, $20_2$, $20_3$, and $20_4$, and ten segments along the source-drain direction. For example, the ten segments forming $20_1$ are $20_{11}$, $20_{12}$, $20_{13}$, $20_{14}$, $20_{15}$, $20_{16}$, $20_{17}$, $20_{18}$, $20_{19}$, and $20_{110}$. For simplicity and clarity, only segments $20_{11}$ and $20_{19}$ are identified in FIG. 1. The remaining channel segments $20_2$, $20_3$, and $20_4$ are also similarly divided. Although, in the exemplary device shown in FIG. 1, the channel is divided into 10 segments along the direction of current flow (x-axis), and into four segments perpendicular to the direction of current flow (y-axis), it is understood that in other embodiments, the channel may be partitioned into N segments along the direction of current flow and M segments perpendicular to the direction of current flow, where M and N are integers greater than 1. As is described further below, a physical model in accordance with embodiments of the present invention, computes the mobility and hence the velocity of carriers in accordance with their positions in the channel both along the x-axis and y-axis. Carriers are injected into the channel region from source 10 from one or more injection points (not shown in FIG. 1 for simplicity). Channel region 20 includes the ballistically modified region through which carriers achieve ballsitically-modified mobility or velocity, as described further below. Although in FIG. 1 the channel is shown as being partitioned nearly evenly and into regular geometrical shapes, it is understood that in other embodiments the channel region may be partitioned into irregular geometrical shapes and arrangement such that the resulting points, elements, or segments of the channel may be neither perpendicular nor parallel to the direction of current flow, with the current flowing in different directions at different positions within the channel.

For an electrostatically controlled device, the carriers should be confined to the channel when they flow between the source and drain regions. This is typically achieved geometrically, via the use of thin layers, fins, cylinders, etc., or via doping. For example, a substrate with a doping type opposite that of the source and drain regions makes it energetically unfavorable for carriers to cross from the source to the drain except where they are induced by the proximity of a gate with appropriate charge. So in such a structure, the channel region could be defined as the region proximate to the gate where carriers are induced. For example, if carriers are typically induced within 3 nm of an interface with an insulator such as $SiO_2$, then the channel region could extend from a region near the source toward a region near the drain along the gate, and further extend from the insulator toward the substrate for a distance of, for example, 5 nm perpendicular to the gate. In the case of carriers confined by the geometry, for example in a thin layer, a narrow fin, a thin cylinder, or the like, the area confined by region near the source to the region near the drain can be defined as the ballistic region.

Once a ballistic region is defined, for each boundary condition (for example, a bias condition at contacts to the simulation domain) the total carrier energy representing the ballistic total energy limit is defined. This could be specified explicitly, for example, as a fixed value or calculated using a fixed function of the terminal biases. Alternatively, it may be extracted from the ballistic region or points proximate to the ballistic region.

Figure 2:
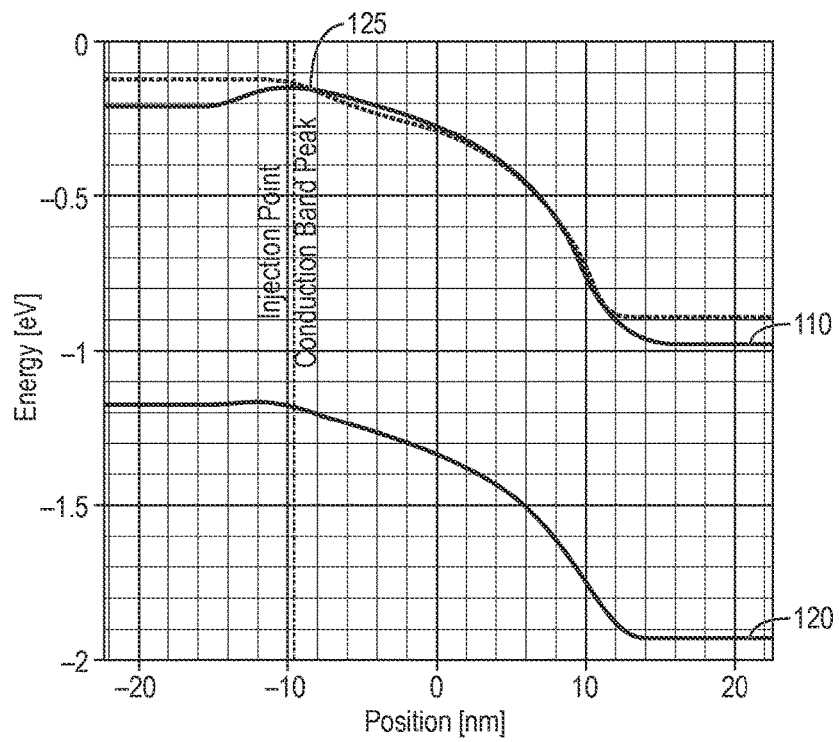
FIG. 2 is an exemplary conduction and valence band of an electron near a source region of the field-effect transistor of FIG. 1.

One solution to extracting the total carrier energy is to identify an injection region. This may be identified, for example, as an injection point where a conduction band energy (for electrons) or a valence band energy (for holes) reaches a local maximum. FIG. 2 shows an electron conduction band 110, valence band 120, and the injection point 125 near a source region of a semiconductor device and positioned at or close to a maximum of conduction band 110. At such an injection point, a carrier's kinetic energy can be calculated using a velocity derived from the field-based local model. For example, the drift-diffusion model, or an enhanced version of this model, may yield a good estimate of the mean carrier velocity at an injection point or over an injection zone, as described further below. Using an effective mass approximation or via other means, for the injection point if only one is defined, or for points in the injection zone, an effective carrier kinetic energy can be derived. The total energy for carriers at such points may be obtained as described in expression (1) below. In addition to these energy components, a degeneracy term derived from Fermi-Dirac statistics may be added to represent the enhanced energy of carriers there due to Fermi exclusion. For simplicity the equations listed herein do not include an adjustment for Fermi-Dirac statistics.

If an injection zone instead of a single injection point is used, the total carrier energy used for such calculation may be the maximum energy of the points on the injection zone, or alternatively, an average energy on the injection zone. Different strategies have different advantages and disadvantages. The advantage of the maximum value over a zone is that it avoids the risk of negative kinetic energies. The risk is that it makes the result susceptible to numerical fluctuations encountered in computationally solving the equations governing the physics at that point. So a balance of robustness and attaining a relative maximum may be provided by a weighted average. A single point approach is simpler, however, and can be implemented with essentially a one-dimensional search. For example, in one example, such a point may be defined at 1 nm from the gate insulator near the center of the channel and then extended along and parallel to the gate insulator. Initially, the conduction band energy may be obtained for a given bias point. Next, moving toward the source, the conduction band energy along the direction parallel to the gate insulator is computed until a maximum of this energy is obtained. By constraining the location to, for example, a mid-channel point of, for example, 1 nm from a gate insulator, complex multi-dimensional searches are avoided.

For example, assume that the kinetic energy associated with an injection point has a value of, for example 5 meV. In accordance with embodiments of the present invention, the maximum carrier kinetic energy at any given point along the channel is the sum of 5 meV and the amount by which the carrier potential energy at the injection point exceeds the carrier potential energy at that point in the channel, and optionally further a difference from Fermi statistics. This yields a total maximum kinetic energy from which a ballistically limiting velocity can be calculated using, for example, an isotropic effective mass approximation. For example, in accordance with one embodiment, the maximum kinetic energy $E_{kmax}$ for an electron may be defined as:

$$E_{kmax} = \left[\frac{1}{2}m*\left(\frac{J_e}{qn}\right)^2 + E_c\right]_{IP} - E_C \quad (1)$$

In equation (1), $E_{kmax}$ represents the maximum energy of an electron, $m^*$ represents the effective mass of the electron at the injection point, $J_e$ represents the current flux at the injection point, $$\left(\frac{J_e}{qn}\right)$$

represent the velocity of the electron at the injection point, parameter $E_C$ inside the square brackets represents the conduction band energy at the injection point, the subscript "IP" indicates that the value within the square brackets is evaluated at the injection point, and $E_C$ outside the square brackets represents the conduction band energy at the point the energy is being calculated. It is understood that the expression $$\frac{1}{2}m*\left(\frac{J_e}{qn}\right)^2$$

represents the kinetic energy of the electrons at the injection point. It is also understood that other relationships defining the maximum kinetic energy of an electron may also be used.

The maximum energy $E_{kmax}$ may be used to determine the ballistic mobility $\mu_B$, as shown below:

$$\mu_B = -qsqrt\left[\frac{2E_{kmax}}{m^*}\right] / \nabla E_{FN} \quad (2)$$

In expression (2), $\nabla E_{FN}$ represents the gradient of the quasi-Fermi level. The parameters $E_{kmax}$, $m^*$, and $\nabla E_{FN}$ in expression (2) are evaluated at the same point where the ballistic mobility term $\mu_B$ is determined.

Once the drift-diffusion mobility and the ballistic mobility (which are related to the velocity) are determined, a net velocity may be calculated. In a scalar velocity (assuming the direction of the ballistically limited velocity is aligned with the direction of the drift-diffusion velocity), the magnitude of the total mobility $\mu_{tot}$ or velocity may be defined as the reciprocal of the sum of the reciprocals of the ballistic velocity (or mobility $\mu_B$) and the drift-diffusion velocity (or drift-diffusion mobility $\mu_{DD}$), as shown below:

$$\mu_{tot}^{-1} = \mu_{DD}^{-1} + \mu_B^{-1} \quad (3)$$

In some embodiments, $\mu_B$ may be scaled by one or more factors to account for variations thereto. For example, $\mu_B$ may be scaled by a saturation factor and a mobility stress factor to account for stresses present in the semiconductor through which the charges travel. In one example, $\mu_B$ may be scaled as shown below:

$$\mu_B \rightarrow \mu_B[1+\text{SaturationFactor} \times (\text{MobilityStressFactor}-1)] \quad (4)$$

In expression (4), $\mu_B$ is shown as being scaled by the saturation factor parameter "SaturationFactor" and a mobility stress factor parameter MobilityStressFactor. It is understood that the above scaling parameters are exemplary and that many other scaling parameters may be used to scale $\mu_B$.

In some embodiments, $\mu_{DD}$ may be scaled by one or more factors to account for variations thereto. For example, $\mu_{DD}$ may be scaled by a mobility stress factor to account for stresses present in the semiconductor through which the charges travel. In one example, $\mu_{DD}$ may be scaled as shown below:

$$\mu_{DD} \rightarrow \mu_{DD} \times \text{MobilityStressFactor} \quad (5)$$

In expression (5), $\mu_{DD}$ is shown as being scaled by the mobility stress factor parameter MobilityStressFactor. It is understood that the above scaling is exemplary and that many other scaling parameters may be used to scale $\mu_{DD}$. It is further understood that expression (3) may be carried out after performing the scaling operations on $\mu_B$ and $\mu_{DD}$.

In some embodiments, when carrier concentration is not constant, the drift-diffusion carrier velocity is calculated from the gradient of a quasi-Fermi potential (under the assumption of local thermal equilibrium) rather than from the gradient of the electrostatic potential (the electric field). Other effects may cause a modification of the model. For example, the effective mass of the carriers may be energy-dependent. This effect is typically called nonparabolicity since it yields bands whose energy as a function of momentum in some directions are no longer parabolic. The velocity may be converted to mobility or vice versa. The term total mobility, $\mu_{tot}$, is also referred to as the ballistically-adjusted mobility or net mobility.

Embodiments of the present invention also account for high-energy effects such as optical phonon scattering or the transferred carrier effect. For example, in one embodiment for electrons and holes, a ballistic fraction defined by the ratio of the ballistically-modified velocity (or mobility) to the ballistic velocity (or mobility), is derived. The ballistically-modified velocity and the ballistic velocity are assumed to be in the same direction. This ratio, which is a scalar quantity between 0 and 1 (inclusive), describes the degree to which carriers of a given type are limited by their inertia rather than by the typical mechanisms limiting velocity in the drift-diffusion approximation, such as the various scattering processes. If carriers are ballistically limited, then it can be assumed that the kinetic energy in excess of the thermal component is substantially aligned along the direction of carrier flow. In an isotropic approximation and in the absence of substantial quantum confinement, the kinetic energy may increase by up to a factor of, for example, three along the transport direction before a threshold for enhanced scattering, such as, optical phonon scattering or inter-valley carrier transfer, is reached. If energy-independent effective mass is assumed, the velocity increases asymptotically by a factor of, for example, square root of 3, thus setting an upper bound for the ballistically limited current. However to the extent that high-energy scattering mechanisms may result in a decreased ballisticity, such calculations need to be done self-consistently. Velocity saturation reduces the ballisticity, which in turn, reduces the saturation velocity, further reducing ballisticity. The calculations should thus be performed iteratively to maintain self-consistently.

The other effect on velocity saturation is the abruptness with which velocity saturation occurs. In one embodiment, this abruptness may depend on the maximum kinetic energy and the temperature, for example, the lattice temperature evaluated at the injection region. The assumption is that if the temperature is very high in comparison to the optical phonon generation threshold, or if the carriers have accelerated through a potential drop much larger than the optical phonon generation threshold, then the abruptness of the onset of velocity saturation approaches a universal value for that carrier under those conditions in that semiconductor in that device type. However, if the potential energy drop experienced by the carriers since the injection point or another reference point, together with the kinetic energy the carriers had at that point and the thermal energy describing the spread in the carriers kinetic energy amounts to a value less than the optical phonon generation threshold, then the prevalence of carriers with energy at least equal to the threshold will be less than it would have been had the carriers had the opportunity to acquire more kinetic energy. By increasing the abruptness of the onset of optical phonons as a function of the ratio of the optical phonon threshold energy to the sum of a thermal energy and the maximum carrier kinetic energy, a more realistic representation of the opportunity for lucky or otherwise abnormally energetic electrons to scatter due to a high energy process, such as optical phonon scattering, is realized. Parameter $\beta$, described above and which represents the abruptness of the onset of high-energy scattering mechanisms, or the abruptness with which velocity saturation is reached, may be defined as:

$$\beta = \beta_0 \exp\left[\frac{\hbar \omega_{opt}}{\alpha k T + E_{kmax}}\right] \quad (6)$$

In the above expression (6), k represents the Boltzmann constant, T represents the temperature in Kelvin, $\hbar$ represents the Planck's constant, $\hbar \omega_{opt}$ represents the threshold energy for generating optical phonons, $\alpha$ is a coefficient that may have different values (e.g., 0.5, 1 or 1.5), and $\beta_0$ is defined by the drift-diffusion model. It is understood that expression (6) is exemplary and that the relationship between $\beta$ and the other parameters shown in expression (6) may take many other forms. The saturation velocity $v_{sat}$ may be defined as:

$$v_{sat} = v_{sat0} sqrt\left[\frac{3\mu_B}{(3\mu_B - 2\mu_{tot})}\right] \quad (7)$$

In expression (7), $v_{sat}$ denotes the asymptotic velocity in the high-energy limit. For semiconductors where the transferred carrier effect is important, a similar approach may be taken, for example, by using a ballistic fraction and/or a ratio of energies including an energy threshold, a kinetic energy term, and/or a thermal energy term to adjust parameters describing the effect. Embodiments of the present invention thus model the observed behavior that the transferred electron effect tends to be suppressed in devices with a short channel.

Similarly, when a hydrodynamic model (described further below) which treats a carrier temperature as a scalar field is used, a ballistic fraction calculated, for example, using one of the approaches described here, may be used to partition the carrier kinetic energy into ballistic and thermal components. This can reduce some of the anomalies which may occur when treating all carrier kinetic energy as thermal.

An example of the hydrodynamic modeling of carrier transport is incorporated in the Sentaurus Device simulation tool (Sentaurus™ Device manual, version I-2013.12, 2013, page 211, commercially available from Synopsys Inc). The equations shown below apply to electrons but similar equations apply to holes. Assuming default coefficients:

$$\partial W_n + \nabla \cdot S_n = (-1/q) J_n \cdot \nabla E_c + (\partial W_n/\partial t)_{coll} \quad (8)$$

$$S_n = -1.5(kT_n/q)(J_n + n\mu_n \cdot \nabla kT_n) \quad (9)$$

In the above expressions (8) and (9), the term $(\partial W_n/\partial t)_{coll}$ represents a collision term dependent upon an energy relaxation time, $W_n$ represents a thermal energy density 1.5 $nkT_n$, $\nabla$ is a gradient operator, n is the electron density, $J_n$ is the electron current density, k represents the Boltzmann constant and $T_n$ represents the electron temperature.

Expression (8) and (9) respectively represent energy conservation and heat flux. The energy conservation equation contains a generation term $J_n \cdot \nabla E_c$ which is based on the assumption that as carriers move from a higher to a lower potential energy, at a given carrier temperature, the change in potential energy is conserved as an increase in carrier temperature.

Under the ballistic transport, however, the carriers do not become hotter in the sense that random thermal motion becomes greater, but rather the carriers experience a systematic acceleration. So when ballistic transport is prominent, only a fraction of the potential energy change goes to carrier heat. The simplest assumption is that carriers exist in two modes, a ballistic mode and a diffusive mode. The ballistic mode is assumed to have no scattering, while the diffusive mode is assumed to be constantly scattering.

With this simplifying assumption, there are two ways in which carriers can convert potential energy into heat. One is if they are in a mode of continuously scattering, to move across a gradient in potential. That change in potential comes with an instantaneous change in carrier heat. The other is if a carrier changes from ballistic to diffusive. In such a case, the full excess kinetic energy accumulated by the carrier, which is the difference between the potential at the injection point at the potential at the local position adjusted for a difference in the thermal energy between the injection point and the present position, is converted into heat. The result is shown in expression (10) below:

$$\left(\frac{\partial W_n}{\partial t}\right) + \nabla \cdot S_n = \left(-\frac{1}{q}\right)[(1-f_B)J_n \cdot \nabla E_c - [E_{CIP} - E_C + 1.5k(T_{nIP} - T_n)]J_n \cdot \nabla f_B] + \left(\frac{\partial W_n}{\partial t}\right)_{coll} \quad (10)$$

In expression (10), $E_{CIP}$ and $T_{nIP}$ represent the conduction band energy and the temperature of the electrons at the injection point, $E_c$ is the conduction band energy of the point being calculated, $f_B$ is the ballistic fraction defined by v the mean electron speed, v, and the electron ballistic velocity $v_B$. For example, the ballistic fraction may be defined by the heuristic expression (11) below:

$$f_B = v/v_B \quad (11)$$

Consider the case of a ballistic transistor where the carriers injected at a source ballistically travel across a channel, and are collected by a drain where they thermalize due to scattering there. With the conventional hydrodynamic model, the gradient of the conduction band energy is greatest in the channel, and therefore it is in the channel that the greatest amount of heat is generated. However, in accordance with one aspect of the present invention, the carriers in the channel are fully ballistic, and therefore the generation due to the gradient in the conduction band energy is zero. However, in the drain, where the gradient in ballistic fraction becomes large, the full energy difference between the conduction bands of the source and drain is converted to carrier heat. For FinFET and nanowire transistors, where the channel regions may be relatively thin and have relatively low thermal conductivity (thermal conductivity being reduced in thin layers), while the drain regions are relatively larger and thus have relatively greater thermal conductivity, a shift in the region of heat generation may have a significant effect on the predicted behavior of the device.

Solving for lattice temperature includes similar considerations similar to those for carrier temperature. With the simulator Sentaurus™ Device, the equations governing the solution of lattice temperature are called the thermodynamic model, and not hydrodynamic model which governs carrier temperature. The same technique described herein in which ballistic carriers (which cause no lattice heating) are separated from diffusive carriers (which deliver heat to the lattice through scattering), applies.

For example, the thermodynamic model in Sentaurus™ Device includes the following contribution for electrons, with a similar contribution for holes:

$$-\nabla \cdot (\varphi_n J_n) + (1/q)(E_c + 1.5kT) \cdot J_n \quad (12)$$

where $\varphi_n$ is the electron quasi-Fermi potential, $E_c$ is the conduction band energy, and kT is the thermal energy. A similar contribution is assumed for holes.

Expression (12) assumes that if carriers are flowing and that a gradient of the quasi-Fermi potential exists along the same direction then that current adds heat to the lattice. Similarly, it assumes if there is a divergence in carrier flux, then heat is added to or removed from the lattice. However, when transport is ballistic, the carriers fail to interact with the lattice, and there is no effect on the lattice temperature. Additionally, when carriers go from being purely ballistic to purely diffusive, carrier kinetic energy is lost. Assuming a carrier heat is not being also modeled (thermodynamic, not hydrodynamic) the lost energy goes to heating the lattice. The above expression may thus be modified as shown below in expression (13):

$$(1-f_B)[-\nabla \cdot (\varphi_n J_n) + (1/q)(E_c + 1.5kT)\nabla \cdot J_n] + (1/q)[E_{CIP} - E_c + 1.5k(T_{IP} - T)]J_n \cdot \nabla f_B \quad (13)$$

In expression (13), $\nabla$ is the gradient operator, $J_n$ represents the electron current density, $E_{CIP}$ and $T_{IP}$ represent the conduction band energy and the temperature at the injection point, and T represents the electron temperature. Two contributions are captured by expression (13). One is due to the current flow of carriers undergoing scattering. This component is proportional to one minus the ballistic fraction $f_B$. The other component is due to the carriers transitioning from ballistic to diffusive transport. These carriers yield their excess kinetic energy as lattice heating. Assuming the carriers have a degree of random motion consistent with the carrier temperature being equal to the lattice temperature, the excess kinetic energy is calculated using a combination of the potential energy at the injection point and the position of interest, as well as the lattice temperature at the injection point and the position of interest.

In addition to the total energy, the lattice temperature may be derived for the ballistic region. One approach to achieve this, is to use the temperature calculated for each point in the ballistic region. However, since ballistic carriers are assumed to interact weakly with the lattice, it may be preferred to calculate the temperature in a fashion similar to the calculation of the ballistic energy limit, namely to calculate a temperature at an injection point, or a temperature averaged over an injection zone, or the maximum value of the temperature over a ballistic region, or a weighted average of the temperature over the ballistic region.

Given the attraction of simplicity for identifying a single injection point, the temperature at that point could be used in one embodiment. It could be assumed that carriers interact with the lattice through frequent scattering until they reach the injection point, and upon entering the channel are more rapidly accelerated and subjected to a probability of ballistic transport, during which the spread in energy associated with the thermal characteristics of the injection point are retained by the ballistic subset of the carrier population traversing the channel region. Commonly, however, simulations are carried out by assuming a nearly constant global temperature. Alternatively, simulations may be carried out while assuming different temperatures for carriers of different types and the lattice. In such simulations, the carrier temperature at the injection point might be used instead of the lattice temperature. In such simulations, it is generally assumed that the carriers are in thermal equilibrium with other carriers of the same type, but not in thermal equilibrium with carriers of a different type, and not in thermal equilibrium with the lattice. Ballistic carriers injected into the channel may be assumed to retain the kinetic energy spread of the appropriate carrier temperature at the injection point.

Once the total energy and a temperature are established for a defined ballistic region, a self-consistent solution within the ballistic region can be obtained. Such a solution involves an initial estimate. In equilibrium, with no current flowing, ballisticity is not a significant factor. From this state, a small bias can be applied. With a sufficiently small bias, velocities are small. With a small potential drop, the ballistic velocity is proportional to the square root of the potential drop. The ballistic velocity tends to increase rapidly with an initial small potential drop, but less rapidly as the potential drop increases further. On the other hand, the local field-based model tends to predict currents proportional to the gradient of the potential.

Consider a changing device state in which the electric field is increasing, thus increasing the potential drop. As the potential drop increases, the ballistic-model velocity increases rapidly (e.g., proportional to the square root of the drop in potential over a given distance) whereas the local field-based model velocity increases nearly linearly with the potential drop. As a result, the local field-based model velocity tends to dominate for very small potential drops, and the ballistic-model velocity becomes a small adjustment to the local field-based model solution. As the potential drop increases, however, the square root dependence of the ballistic-model velocity on the potential drop results in the ballistic-model velocity increasing in magnitude more slowly than the local field-based velocity. In such a case, the ballistic-model velocity may have a proportionately larger impact on ballistically-adjusted mobility as the electric field is increased. If the solutions are generated in the order of increasing electric field, the influence of the ballistic model on the adjusted velocity may increase as the electric field is increased, or in some cases may decrease but is unlikely to remain constant. Therefore, by extrapolating the results from the earlier results obtained during the self-consistent solution, an initial guess for the solution in accordance with embodiments of the present invention are provided. The extrapolated initial guess, which may be linear or nonlinear, may yield superior results to other methods of generating an initial condition for a self-consistent solution.

Given an initial guess, the total energy may be re-evaluated, for example, by repeating the search for an injection point. An injection point or injection zone defined in terms of fields (for example the gradient of the conduction band or valence band energy) may yield different results based on the estimated solution known at the time. The injection point may be re-evaluated with each guess for each bias point. Alternatively, the injection point may either be re-evaluated or extrapolated from the solutions associated with the previous bias points. One advantage of such evaluations using confirmed solutions is that it may provide less sensitivity to numerical fluctuations in the solution. For example, it is typical in a semiconductor device simulation to iteratively attempt to solve for fields, check for self-consistency and then repeat the solution. Such an approach results in solutions that meets the threshold for self-consistency and/or satisfied one or more convergence criteria.

An alternative approach for establishing an injection point is to adjust the total energy determined from a prior bias point based on certain criteria. For example, an effective resistance may be assumed to exist on an equipotential surface containing the injection point and at a given bias. The change in total energy at the injection point may be approximated by this resistance multiplied by a change in the current at the contact. Alternatively, the total energy extracted at the injection point may have a linear relationship with the current at the proximate contact. In such cases, the energy could be extrapolated or interpolated from two or more solutions, each of which may use an injection point determined for that bias condition. A number of different ways exist for determining the variation of the total energy for a ballistic region, such as using an injection point approximation, an analytic calculation, or a combination thereof, as is described herein. In accordance with one aspect of the present invention, a total energy for the ballistic region is determined notwithstanding the identification of an injection point or injection zone. One example for calculating the total energy $E_{KMAX}$ is described in expression (1) above.

As with the total energy, the injection point temperature may be updated with each new bias point if bias-dependent and/or position-dependent temperature is being modeled. The above descriptions related to total energy at an injection point, or total energy for a ballistic region, may be used to determine the temperature associated with an injection point.

For a given bias point, such calculation involves the determination of a total energy and temperature for a ballistic region. The temperature may have an assumed value (for example, an ambient temperature), may be solved self-consistently for an entire device or region, or may be solved on a position-wise basis using appropriate models. Thereafter, the temperature may be evaluated at an injection region. An initial value may be estimated for various fields used to model the region. The fields used in modeling the region may include, for example, the electrostatic potential, the electron quasi-Fermi level, the hole quasi-Fermi level, and the lattice temperature. Some fields may be uniform throughout the region while others may be position-dependent. Some may be constant and others may be solved self-consistently using variables. The initial solution may be the result of a self-consistent solution where carrier velocities and fluxes are determined with a ballistic adjustment. Alternatively, a field-dependent local model may be used to determine the carrier velocity for an initial solution, while neglecting ballistic effects. In either case, a carrier velocity or mobility associated with the local field-dependent model, while neglecting ballistic effects, may be initially calculated. This mobility is identified as $\mu_{DD}$ above.

The ballistic adjustment may be performed using a combination of local parameters, such as those described above, and regional parameters which describe the ballistic transport. The regional parameters may include the total energy and the ballistic carrier temperature for each carrier type. The regional parameters are used to determine a ballistic velocity associated with carriers traversing the region ballistically as well as adjustments to other aspects of modeling which may depend on the degree to which carriers are ballistic versus scattered.

The ballistic velocity or mobility may be calculated locally by calculating a kinetic energy for the ballistic carriers. The carriers may be assigned different energy components including a kinetic energy. The kinetic energy may be solved using the constraint on total energy for the ballistic regime. For example, the total energy determined for the ballistic region for a given bias point may be partitioned into a potential component and a kinetic component. For electrons, the potential energy may be taken to be the minimum energy of the conduction band while for holes the potential energy may be taken to be the minimum energy of the valence band. Any remaining energy from the total energy may be considered as the kinetic energy.

If the carriers at a location in the ballistic region are exposed to scattering while traversing the ballistic region, the kinetic energy might be less or the velocities may be randomized such that in calculating the net flux, the velocity of one particle in part cancels the velocity of another particle. But in the ballistic region, carriers at a given position are generally assumed to be moving in the same direction, for example in the direction predicted by the field-dependent model. The conversion from the kinetic energy to velocity in this direction can be carried out using any of a number of well-understood techniques, for example, by using an effective mass approximation, or using a detailed model of the energy band structure.

An example of a simple, isotropic effective mass approximation is $E_k = \frac{1}{2} m_b v_b^2$, where $m_b$ is an effective mass associated with the ballistic transport, $v_b$ is the ballistic velocity (assumed in the same direction as predicted by the local field-dependent mobility model), and $E_k$ is the sum of (i) the local ballistic kinetic energy calculated as the kinetic energy, for example, at an injection point, (ii) the difference in band energies (for example, conduction or valence band) between an injection point and the point of interest, and (iii) a term describing the difference in Fermi exclusion between the injection point and the location of interest.

This calculation yields a ballistic velocity or mobility, while a local field model yields a non-ballistic velocity or mobility. These velocities are then combined to yield a net velocity or mobility. This could be achieve in a number of different way, such as by using expression (1)-(3) or following the example of Shur (described above) and using Matthiessen's rule. Alternatively, one may use the square of the reciprocals of the velocities, take the square root of their sum, and then take the reciprocal of the square root.

Once a ballistic velocity/mobility, a non-ballistic velocity/mobility, and a ballistically-adjusted velocity/mobility, is determined a parameter describing the degree of ballisticity of the carriers at that point may be calculated. For example, the ratio of the ballistically-adjusted velocity to the ballistic velocity (assuming the two are in the same direction) will be a unitless scalar parameter having a value between 0 and 1, inclusive. Such a parameter may represent the degree of ballisticity of a given carrier at a given position. The ratio of the ballistically-adjusted velocity to ballistic velocity, or equivalently the ratio of the ballistically-adjusted mobility to the ballistic mobility is defined herein as the ballisticity for any given point. Such ballisticity may then be used to modify many aspects of the model, for example, the high-energy processes such as optical phonon scattering, intervalley transfer, and carrier heating.

Another representation of the relative effect of a ballistic limit is the ratio of the maximum ballistic kinetic energy to the threshold energy required for the onset of a scattering process. For example, a threshold energy is required for the generation of optical phonons which can reduce the kinetic energy and change the direction of travel of carriers. In silicon this threshold may be approximately 64.1 meV. The relevant kinetic energy is the total kinetic energy of ballistic carriers. This includes the kinetic energy associated with the mean carrier velocity at the injection point, the kinetic energy acquired from a reduction in the potential energy the carriers experience in traveling from the injection point, and random components of energy associated with processes which contribute to the carriers having a non-zero temperature at the injection point. This thermal component of kinetic energy is generally assumed to be random and uncorrelated with the component due to ballistic transport. Therefore the two components can be added. The thermal energy is represented as the Boltzmann's constant multiplied by the temperature. However, this energy may be additionally multiplied by a factor before being added to the kinetic energy. Such a factor may be determined analytically (for example, ½ or 1 or 1½) based on certain assumptions, or it may be empirically set based on matching to rigorous calculations or experimentally derived data. Thus at a non-zero temperature this ratio could be defined by the sum of the kinetic energy and a multiple (for example, one) of the thermal energy divided by the threshold for the onset of some scattering process (for example, optical phonon generation).

Consider the Caughy-Thomas representation of velocity saturation which may be generalized as follows:

$$v = \frac{v_0}{\left[1 + \left(\frac{v_0}{v_{sat}}\right)^\beta\right]^{1/\beta}} \quad (8)$$

where $v_0$ is the velocity determined in the absence of velocity saturation, $v_{sat}$ denotes the asymptotic velocity in the high-energy limit, and ß denotes the abruptness with which velocity saturation occurs. In the ballistic limit and under certain assumptions, the asymptotic velocity could increase by the square root of three. Furthermore, under the ballistic limit, the abruptness parameter β increases, indicating a more abrupt transition to velocity saturation, as described further in expressions (6) and (7) shown above which are solved self-consistently since $V_{sat}$ depends on v, and v depends on $V_{sat}$; thus an iterative solution is performed.

The transferred carrier effect, or more specifically a transferred electron effect, is described and modeled by Barnes, et al., cited above. The model for the transferred carrier effect may be adjusted to account for the degree of carrier ballisticity in a manner similar to that by which scattering associated with optical phonon generation is treated, as described above. For example, velocity overshoot associated with the transferred electron effect is described in "Ballistic Transport and Velocity Overshoot in Semiconductors: Part I-Uniform Field Effects", IEEE Transactions on Electron Devices, Vol. ED-30, No. 2, February 1983, S. L. Teitel and J. W. Wilkins.

There are at least three mechanisms by which ballistic limits can influence the transferred carrier effect. The transferred carrier effect typically requires a minimum carrier kinetic energy for the carrier to transfer from a lower-energy valley to a higher-energy valley. This can be treated in a manner similar to the way parameter β for optical phonon generation is treated. In accordance with the second effect, carriers may accumulate kinetic energy along primarily one or more axes. If the kinetic energy is accumulated along primarily one axis only, namely the transport direction, then the total energy at a given velocity in that direction will be less than the total energy for a given velocity if the kinetic energy is additionally accumulated along an orthogonal axis. This is similar to the effect described for velocity saturation $V_{sat}$. In accordance with the third effect, inter-valley transfer requires scattering with a phonon of the appropriate momentum. Such phonon scattering is less likely to occur in a region where the ballisticity is high than where the ballisticity is low. Thus the transferred carrier effect can depend explicitly on the degree of ballisticity determined using the ratio of the ballistically-adjusted velocity to the ballistic velocity. This determination is made using solution that maintain self-consistently.

A solution to the transferred carrier effect, given an analytical model for how it affects velocity in the constant field limit, is to use a weighted average between an unadjusted velocity and a velocity adjusted based on, for example, the ballisticity, or the maximum kinetic energy and maximum temperature, or some combinations thereof. A form for such a velocity adjustment model is described in "Finite-element simulation of GaAs MESFET's With Lateral Doping Profiles And Submicron Gates", IEEE Transactions on Electron Devices, Vol. 23, No. 9, September 1976, pp. 1042-1048, Barnes, J. J.; Lomax, R. J.; Haddad, G. I.

When the carrier temperature is solved along with other fields, such as those described above, the rate of carrier heating needs to be estimated. Modeling the degree of ballisticity of a carrier population using the techniques described herein improves the accuracy of carrier temperature estimation in such models. Carrier temperature describes a degree of randomness of carrier velocities due to their random motion and contributing to certain phenomena such as diffusion. In a purely ballistic limit, carrier random motion may not be substantially increased. A ballistic fraction may be used to partition the carrier kinetic energy into random and coherent components, and thus allow such phenomena as enhanced carrier diffusion due to increased carrier kinetic energy to be more accurately treated.

Figure 3:
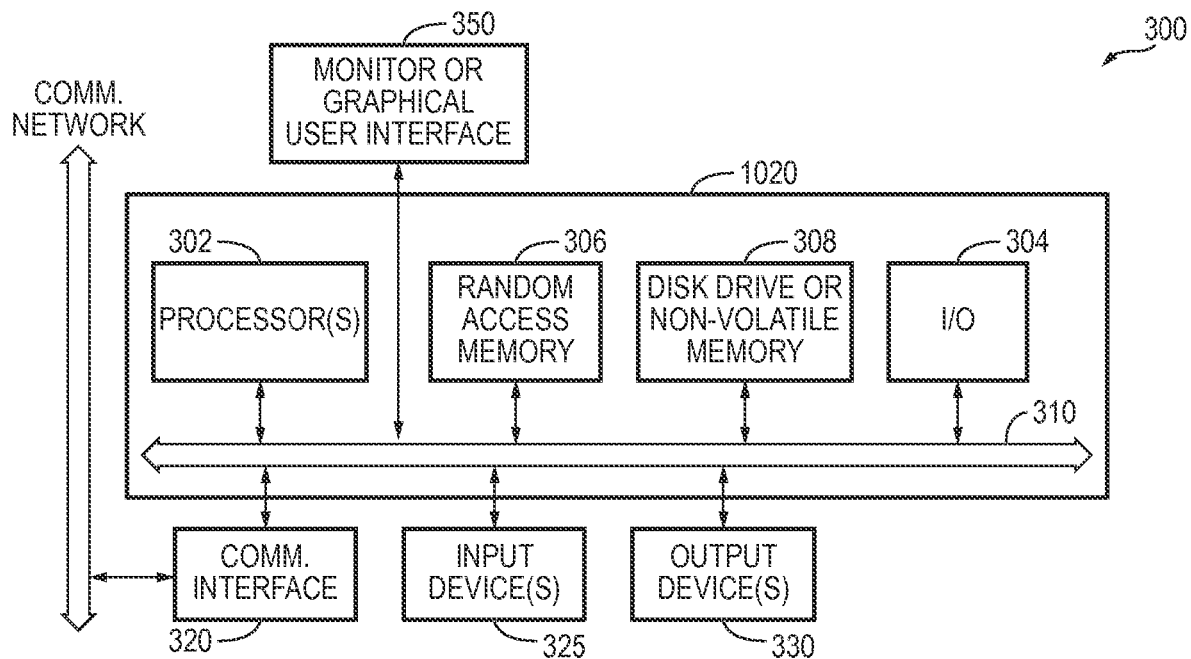
FIG. 3 is an exemplary block diagram of a computer system configured to design an integrated circuit having disposed therein devices simulated using a physical model, in accordance with embodiments of the present invention.

FIG. 3 is an exemplary block diagram of a computer system 300 used to design an integrated circuit having disposed therein devices, such as transistors, that are simulated using the models described above, in accordance with an embodiment of the present invention. Computer system 300 is shown as including, in part, one or more processing units 302, an input/output ("I/O") component 304, a random access memory 306, and a disk drive or non-volatile memory 308. Computer system 300 is also shown as including a number of peripheral devices, such as display monitor 350, one or more user output device 330, one or more user input devices 325, and communications interface 320. Processor 302 is configured to communicates with a number of peripheral devices via bus 310.

User input devices 325 include all possible types of devices and mechanisms for inputting information to computer system 300. These may include a keyboard, a keypad, a touch screen incorporated into the display, audio input devices such as voice recognition systems, microphones, and other types of input devices. In various embodiments, user input devices 325 are typically embodied as a computer mouse, a trackball, a track pad, a joystick, wireless remote, drawing tablet, voice command system, eye tracking system, and the like. User input devices 325 typically allow a user to select objects, icons, text and the like that appear on the display monitor 350 via a command such as a click of a button or the like.

User output devices 330 include all possible types of devices and mechanisms for outputting information from computer 300. These may include a display (e.g., monitor 350), non-visual displays such as audio output devices, etc.

Communications interface 320 provides an interface to other communication networks and devices. Communications interface 320 may serve as an interface for receiving data from and transmitting data to other systems. Embodiments of communications interface 320 typically include an Ethernet card, a modem (telephone, satellite, cable, ISDN), (asynchronous) digital subscriber line (DSL) unit, FireWire interface, USB interface, and the like. For example, communications interface 320 may be coupled to a computer network, to a FireWire bus, or the like. In other embodiments, communications interface 320 may be physically integrated on the motherboard 370 of computer system 300, and may be a software program, such as soft DSL, or the like.

In various embodiments, computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

Random access memory 306 and disk drive 308 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. Random access memory 306 and disk drive 308 may be configured to store software code, instructions, and data constructs that provide the functionality of the present invention. The instruction and software may be executed by processor 302. Random access memory 306 and disk drive 308 may also provide a repository for storing data used in accordance with the present invention.

Random access memory 306 may include a random access memory (RAM) for storage of instructions and data during program execution and a read only memory (ROM) in which fixed non-transitory instructions are stored. Random access memory 306 and disk drive 308 may include a file storage subsystem providing persistent (non-volatile) storage for program and data files. Computer system 300 may also include removable storage systems, such as removable flash memory.

Bus 310 provides a mechanism for enabling the various components and subsystems of computer 300 to communicate with each other as intended. Although bus 300 is shown schematically as a single bus, alternative embodiments of the bus subsystem may utilize multiple busses.

Computer system 300 may be a desktop, portable, rack-mounted or tablet configuration. Additionally, computer system 300 may include a number of networked computers. Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

Figure 4:
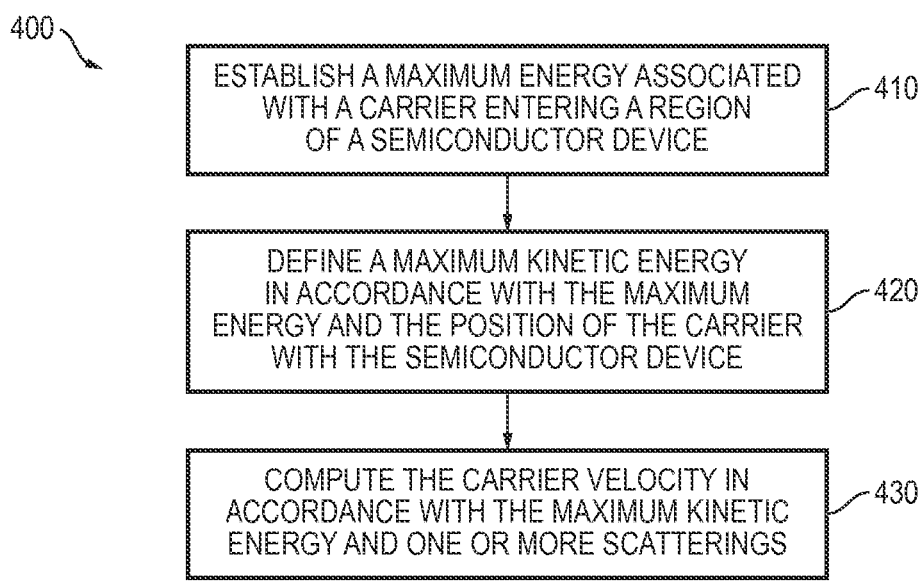
FIG. 4 is a flowchart for simulating a semiconductor device behavior, in accordance with one embodiment of the present invention.

FIG. 4 is a flowchart 400 for simulating a semiconductor device behavior, in accordance with one embodiment of the present invention. A maximum energy associated with a carrier entering a region of the semiconductor device is established at 410. A maximum kinetic energy associated with the carrier is defined at 420 in accordance with the established maximum energy and further in accordance with the position of the carrier within the semiconductor device. Thereafter, the carrier's velocity is computed at 430 in accordance with the maximum kinetic energy and further in accordance with one or more scatterings. The maximum kinetic energy of the carrier establishes an upper bound for the velocity of the carrier. In one embodiment, at least one of the scatterings represents intervalley scattering.

In one embodiment, the maximum kinetic energy is characterized by a kinetic energy of the carriers entering the region of the semiconductor device and a potential energy associated with a position of the carrier within the region of the semiconductor device. In one embodiment, the maximum kinetic energy is further characterized by a local maximum of a conduction band energy associated with the region of the semiconductor device. In one embodiment, the maximum kinetic energy is further characterized by a local minimum of the valence band energy associated with the region of the semiconductor device.

The above descriptions of embodiments of the present invention are illustrative and not limitative. Other modifications and variations will be apparent to those skilled in the art and are intended to fall within the scope of the appended claims.

What is claimed is:

1. A computer-implemented method for simulating a field-effect transistor for use in design of a semiconductor integrated circuit, the computer-implemented method comprising:
    defining, using the computer, a kinetic energy associated with a carrier entering a channel of the field-effect transistor in accordance with a position of the carrier within the channel; and
    computing, using the computer, a velocity of the carrier in accordance with the kinetic energy and further in accordance with one or more scatterings, said kinetic energy establishing an upper bound for a velocity of the carrier.

2. The computer-implemented method of claim 1 further comprising:
    partitioning the kinetic energy of the carrier into a ballistic component and a thermal component.

3. The computer-implemented method of claim 2 further comprising:
    computing a ballistic velocity for the carriers in accordance with the kinetic energy; and
    computing a ballistic fraction for a position within the region, said ballistic fraction defined by a ratio of the computed velocity at the position and a ballistic velocity limit.

4. The computer-implemented method of claim 3 further comprising
    partitioning the kinetic energy of the carrier into a ballistic component and a thermal component in accordance with the ballistic fraction.

5. The computer-implemented method of claim 3 further comprising:
    partitioning a population of the carriers across a plurality energy bands in accordance with the ballistic fraction.

6. The computer-method of claim 3 wherein said ballistic fraction defines a lattice temperature of the field-effect transistor device.

7. The method of claim 3 wherein said ballistic fraction defines a carrier temperature.

8. The computer-implemented method of claim 1 wherein at least one of the one or more scatterings represents intervalley scattering.

9. The computer-implemented method of claim 1 wherein said kinetic energy is characterized by a kinetic energy of the carrier entering the region and a potential energy associated with a position of the carrier within the region.

10. The computer-implemented method of claim 9 wherein said kinetic energy is further characterized by a local maximum of a conduction band energy associated with the region.

11. The computer-implemented method of claim 9 wherein said kinetic energy is further characterized by a local minimum of a valence band energy associated with region.

12. The computer-implemented method of claim 9 further comprising:
    computing a ballistic mobility value for the carrier in accordance with the kinetic energy.

13. The computer-implemented method of claim 12 further comprising:

computing the ballistic mobility value for the carrier further in accordance with quasi Fermi level.

14. The computer-implemented method of claim 12 further comprising:
computing a diffusion mobility value for the carrier.

15. The computer-implemented method of claim 14 further comprising:
modifying the computed ballistic mobility to account for velocity saturation.

16. The computer-implemented method of claim 15 further comprising:
scaling the modified computed ballistic mobility to account for stress; and scaling the diffusion mobility to account for stress.

17. The computer-implemented method of claim 16 further comprising:
computing a total mobility in accordance with the scaled modified ballistic mobility and the scaled diffusion mobility.

18. The computer-implemented method of claim 17 wherein an inverses of the total mobility is defined by a sum of inverses of the scaled modified ballistic mobility and the scaled diffusion mobility.

19. The computer-implemented method of claim 18 further comprising:
computing a saturation velocity of the carrier in accordance with the ballistic mobility and the total mobility.

20. The computer-implemented method of claim 19 further comprising:
modifying the velocity in accordance with an abruptness parameter indicative of an abruptness of an onset of scattering.

21. The computer-implemented method of claim 20 wherein said abruptness parameter is defined by a threshold energy for generating optical phonons.

22. The computer-implemented method of claim 21 wherein said abruptness parameter is further defined by the kinetic energy and the Boltzmann constant.

23. The computer-implemented method of claim 1 further comprising:
modifying a velocity of the carrier to account for velocity saturation.

24. The computer-implemented method of claim 1 further comprising:
partitioning a population of carriers across a plurality of energy bands.

25. The computer-implemented method of claim 24 further comprising:
modifying a mean velocity of the carriers in accordance with the population of the carriers in the plurality of the energy bands.

26. A computer system comprising a processor and a memory operative to receive a software program configured to design/simulate a semiconductor integrated circuit comprising at least one field-effect transistor, said computer system when invoked by the software program being caused to:
define a kinetic energy associated with a carrier entering a channel of the field-effect transistor in accordance with a position of the carrier within the channel; and
compute a velocity of the carrier in accordance with the kinetic energy and further in accordance with one or more scatterings, said kinetic energy establishing an upper bound for a velocity of the carrier.

27. The computer system of claim 26 wherein said computer system is further caused to:
partition the kinetic energy of the carrier into a ballistic component and a thermal component.

28. The computer system of claim 27 wherein said computer system is further caused to:
compute a ballistic velocity for the carriers in accordance with the kinetic energy; and
compute a ballistic fraction for a position within the region, said ballistic fraction defined by a ratio of the computed velocity at the position and a ballistic velocity limit.

29. The computer system of claim 28 wherein said computer system is further caused to:
partition the kinetic energy of the carrier into a ballistic component and a thermal component in accordance with the ballistic fraction.

30. The computer system of claim 28 wherein said computer system is further caused to:
partition a population of the carriers across a plurality energy bands in accordance with the ballistic fraction.

31. The computer system of claim 28 wherein said ballistic fraction defines a lattice temperature of the field-effect transistor.

32. The computer system of claim 28 wherein said ballistic fraction defines the carrier temperature.

33. The computer system of claim 26 wherein at least one of the one or more scatterings represents intervalley scattering.

34. The computer system of claim 26 wherein said kinetic energy is characterized by a kinetic energy of the carriers entering the region and a potential energy associated with a position of the carrier within the region.

35. The computer system of claim 34 wherein said kinetic energy is further characterized by a local maximum of a conduction band energy associated with the region.

36. The computer system of claim 34 wherein said kinetic energy is further characterized by a local minimum of a valence band energy associated with the region.

37. The computer system of claim 34 wherein said computer system is further caused to:
compute a ballistic mobility value for the carrier in accordance with the kinetic energy.

38. The computer system of claim 37 wherein said computer system is further caused to:
compute the ballistic mobility value for the carrier further in accordance with quasi Fermi level.

39. The computer system of claim 37 wherein said computer system is further caused to:
compute a diffusion mobility value for the carrier.

40. The computer system of claim 39 wherein said computer system is further caused to:
modify the computed ballistic mobility to account for velocity saturation.

41. The computer system of claim 40 wherein said computer system is further caused to:
scale the modified computed ballistic mobility to account for stress; and
scale the diffusion mobility to account for stress.

42. The computer system of claim 41 wherein said computer system is further caused to:
compute a total mobility in accordance with the scaled modified ballistic mobility and the scaled diffusion mobility.

43. The computer system of claim 42 wherein an inverses of the total mobility is defined by a sum of inverses of the scaled modified ballistic mobility and the scaled diffusion mobility.

44. The computer system of claim 43 wherein said computer system is further caused to:
  compute a saturation velocity of the carrier in accordance with the ballistic mobility and the total mobility.

45. The computer system of claim 44 wherein said computer system is further caused to:
  modify the velocity in accordance with an abruptness parameter indicative of an abruptness of an onset of scattering.

46. The computer system of claim 45 wherein said abruptness parameter is defined by a threshold energy for generating optical phonons.

47. The computer system of claim 46 wherein said abruptness parameter is further defined by the kinetic energy and the Boltzmann constant.

48. The computer system of claim 26 wherein said computer system is further caused to:
  modify a velocity of the carrier to account for velocity saturation.

49. The computer system of claim 26 wherein said computer system is further caused to:
  partition a population of carriers across a plurality of energy bands.

50. The computer system of claim 49 wherein said computer system is further caused to:
  modify a mean velocity of the carriers in accordance with the population of the carriers in the plurality of the energy bands.

* * * * *